United States Patent
Liu et al.

(10) Patent No.: US 8,932,792 B2
(45) Date of Patent: Jan. 13, 2015

(54) PREPARATION OF POLYESTER LATEX EMULSIFICATION BY DIRECT STEAM INJECTION

(71) Applicant: Xerox Corporation, Norwalk, CT (US)

(72) Inventors: Yu Liu, Mississauga (CA); Yulin Wang, Oakville (CA); Ke Zhou, Oakville (CA); Frank Ping-Hay Lee, Oakville (CA); Yiliang Wu, Oakville (CA); Shigang S. Qiu, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 13/686,374

(22) Filed: Nov. 27, 2012

(65) Prior Publication Data

US 2014/0147786 A1    May 29, 2014

(51) Int. Cl.
*F17C 5/00*    (2006.01)
*C08K 5/07*    (2006.01)
*C08K 5/05*    (2006.01)

(52) U.S. Cl.
USPC .......... 430/137.14; 137/1; 977/773; 524/364; 422/131

(58) Field of Classification Search
CPC ............... C08J 3/20; C08J 3/00; G03G 9/08; C08L 67/00; C08F 2/06; C08F 2/08; C08F 2/10; C08F 2/22
USPC .................. 524/601, 604, 605, 608; 523/523; 430/137.14; 137/1; 977/773
See application file for complete search history.

(56) References Cited

U.S. PATENT DOCUMENTS

| | | | |
|---|---|---|---|
| 3,590,000 A | 6/1971 | Palermiti et al. | |
| 3,644,263 A | 2/1972 | Burke, Jr. | |
| 3,800,588 A | 4/1974 | Larson et al. | |
| 3,879,327 A | 4/1975 | Burke, Jr. | |
| 4,243,566 A | 1/1981 | Burke, Jr. | |
| 4,298,672 A | 11/1981 | Lu | |
| 4,299,952 A * | 11/1981 | Pingel et al. | 528/500 |
| 4,338,390 A | 7/1982 | Lu | |
| 5,346,797 A | 9/1994 | Kmiecik-Lawrynowicz et al. | |
| 5,364,729 A | 11/1994 | Kmiecik-Lawrynowicz et al. | |
| 5,403,693 A | 4/1995 | Patel et al. | |
| 5,418,108 A | 5/1995 | Kmiecik-Lawrynowicz et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,853,943 A | 12/1998 | Cheng et al. | |
| 5,916,725 A | 6/1999 | Patel et al. | |
| 6,063,827 A | 5/2000 | Sacripante et al. | |
| 6,120,967 A | 9/2000 | Hopper et al. | |
| 6,214,507 B1 | 4/2001 | Sokol et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 7,683,142 B2 | 3/2010 | Lai et al. | |
| 7,851,549 B2 * | 12/2010 | Sacripante et al. | 524/601 |
| 7,977,024 B2 | 7/2011 | Zhou et al. | |

(Continued)

*Primary Examiner* — Robert D. Harlan
(74) *Attorney, Agent, or Firm* — Pillsbury Winthrop Shaw Pittman LLP

(57) ABSTRACT

A method for preparing latex emulsion compositions uses a steam-driven emulsification process, and a method for preparing a toner using the latex emulsion compositions. The method includes contacting a resin with an organic solvent and optionally a neutralization agent; and applying steam or heated water vapor to contact the resin to prepare a latex emulsion. An apparatus can perform the method.

18 Claims, 6 Drawing Sheets

(56) References Cited

U.S. PATENT DOCUMENTS

| | | |
|---|---|---|
| 7,989,135 B2 | 8/2011 | Zhou et al. |
| 8,124,309 B2 | 2/2012 | Lai et al. |
| 8,163,459 B2 | 4/2012 | Farrugia et al. |
| 8,168,699 B2 | 5/2012 | Lincoln et al. |
| 2006/0222991 A1 | 10/2006 | Sacripante et al. |
| 2012/0021351 A1 | 1/2012 | Mang et al. |

* cited by examiner

PREPARATION OF POLYESTER LATEX EMULSIFICATION BY DIRECT STEAM INJECTION

TECHNICAL FIELD

The present disclosure is generally directed to a method for preparing a latex or emulsion and an apparatus for preparing the latex or emulsion.

BACKGROUND

Numerous processes are within the purview of those skilled in the art for forming toners. Emulsion aggregation (EA) is one such method. EA toners are generally formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex emulsion by first forming a seed polymer. Other methods of emulsion/aggregation/coalescing for preparing toners are illustrated in U.S. Pat. Nos. 3,644,263; 3,879,327; 4,243,566; 5,403,693; 5,418,108; 5,364,729; 5,346,797; 5,527,658; 5,585,215; 5,650,255; 5,650,256; 5,501,935; 7,683,142; 7,977,024; 8,124,309; 8,163,459; and 8,168,699, the disclosures of which are hereby incorporated by reference in their entirety.

Polyester toners with low melt properties can be prepared using amorphous and crystalline polyester resins. These polyesters must be formulated into emulsions prepared by solvent containing batch processes before they can be incorporated into the toners. The solvent-containing batch processes include, for example, solvent flash emulsification and/or solvent-based phase inversion emulsification (PIE).

Batch processes can be difficult to scale up because their process inputs such as resin acid value, solvent evaporation rate, and neutralization agent evaporation rate could vary and, thus, could cause a wide range in process noises. As a result, a large amount of time and materials could be wasted by taking a trial and error approach, even at laboratory scale, to determine a critical point for preparing a latex with desired particle sizes.

Moreover, conventional PIE processes typically use mechanical agitation, which may not be able to sufficiently and reliably control the mixing efficiency throughout a whole reaction vessel due to the non-Newtonian behavior of liquid-phase materials during the emulsification process. A high mixing field only localizes at the impeller tip, and the mixing strength decreases away from the impeller, especially along the vessel wall region. Also, dead spots or shallow spots with inefficient mixing can be distributed along the edge of the shaft. Further, establishing a more efficient and more complex impeller design might increase cost. Thus, batch-to-batch consistency can be difficult to achieve at this stage.

It would be advantageous to provide a method for preparing a latex or emulsion suitable for use in a toner product, that is more efficient, takes less time, and results in a more consistent toner product than conventional methods for making toner.

SUMMARY

The present disclosure provides a method for preparing a latex or emulsion, the method comprising contacting a resin with an organic solvent and an optional neutralizing agent to form a resin composition; and introducing steam to the resin composition to form the latex or emulsion. In the method disclosed herein, shearing and mixing may occur without mechanical agitation. Agitation can be caused by merely injecting steam into the resin. Using water vapor may increase the speed of the phase inversion of the resin from a "water in oil" solution to an "oil in water" emulsion. Further, spontaneous progress of emulsification at the molecular level may be driven by heat convection and heat conduction. Also, the present disclosure provides for an apparatus to perform the method for preparing the latex or emulsion.

DETAILED DESCRIPTION

Figure 1:
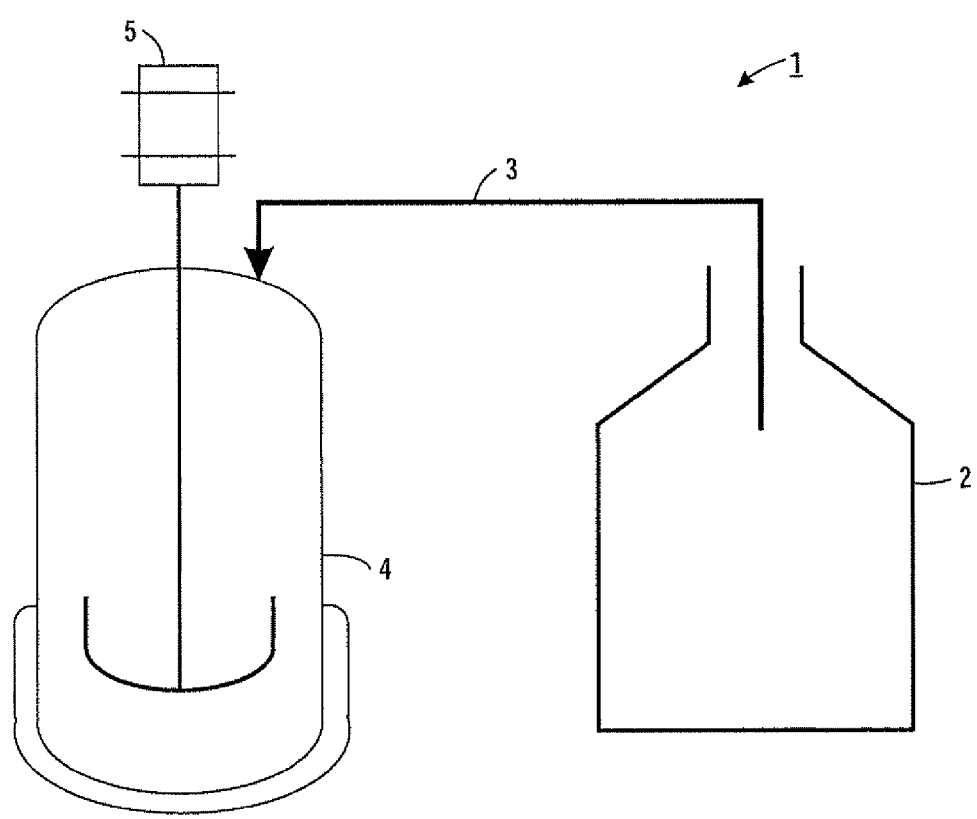
FIG. 1 shows an embodiment of an apparatus for preparing a latex or emulsion.

Disclosed herein is a method for preparing a latex or emulsion using a steam-driven emulsification process. The method includes contacting a resin with an organic solvent and/or a neutralizing agent to form a resin composition; and introducing steam to the resin composition to form a latex or emulsion. In contrast to PIE processes, the steam-driven emulsification process disclosed herein includes injecting, such as continuously injecting, water vapor or steam into a resin composition. The water vapor can carry a significant amount of heat and, thus, heat transfer occurs when water vapor is in contact with the resin composition and the resin composition is at room temperature.

At the initial stage, the "water-in-oil" phase inversion occurs locally, such as at an area near the steam injection. Due to the temperature gradient between the colder portions of the resin composition and the area surrounding the steam injection, the resin quickly aggregates to the area near the steam injection. Thus, emulsion can occur without any external mechanical or magnetic agitation.

Resin Composition

The process disclosed herein includes introducing steam to a resin composition. The resin composition may include a resin contacted with an organic solvent and/or a neutralizing agent, one or more of each of the components of the resin composition may be contacted with the resin. The resin composition can also include a surfactant that is contacted with the resin. Furthermore, each component contacted with the resin to form the resin composition may be contacted with the resin before, during, or after any other component has been contacted with the resin, and, when multiple components are used, they may be contacted with the resin at the same or different times, as desired.

Resin

The resin composition may comprise one or more resins, such as two or more resins. The total amount of resin in the resin composition can be from about 1% to 99%, such as from about 10% to about 95%, or from about 20% to 90% by weight of the resin composition.

A resin used in the method disclosed herein may be any latex resin utilized in forming Emulsion Aggregation (EA)

toners. Such resins, in turn, may be made of any suitable monomer. Any monomer employed may be selected depending upon the particular polymer to be used. Two main types of EA methods for making toners are known. First is an EA process that forms acrylate based, e.g., styrene acrylate, toner particles. See, for example, U.S. Pat. No. 6,120,967, incorporated herein by reference in its entirety, as one example of such a process. Second is an EA process that forms polyester, e.g., sodio sulfonated polyester. See, for example, U.S. Pat. No. 5,916,725, incorporated herein by reference in its entirety, as one example of such a process.

Illustrative examples of latex resins or polymers selected for the non crosslinked resin and crosslinked resin or gel include, but are not limited to, styrene acrylates, styrene methacrylates, butadienes, isoprene, acrylonitrile, acrylic acid, methacrylic acid, beta-carboxy ethyl arylate, polyesters, known polymers such as poly(styrene-butadiene), poly(methyl styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methyl styrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and the like, and mixtures thereof. The resin or polymer can be a styrene/butyl acrylate/carboxylic acid terpolymer. At least one of the resin substantially free of crosslinking and the cross linked resin can comprise carboxylic acid in an amount of from about 0.05 to about 10 weight percent based upon the total weight of the resin substantially free of cross linking or cross linked resin.

The monomers used in making the selected polymer are not limited, and the monomers utilized may include any one or more of, for example, styrene, acrylates such as methacrylates, butylacrylates, β-carboxy ethyl acrylate (β-CEA), etc., butadiene, isoprene, acrylic acid, methacrylic acid, itaconic acid, acrylonitrile, benzenes such as divinylbenzene, etc., and the like. Known chain transfer agents, for example dodecanethiol or carbon tetrabromide, can be utilized to control the molecular weight properties of the polymer. Any suitable method for forming the latex polymer from the monomers may be used without restriction.

The resin that is substantially free of cross linking (also referred to herein as a non cross linked resin) can comprise a resin having less than about 0.1 percent cross linking. For example, the non cross linked latex can comprise styrene, butylacrylate, and beta-carboxy ethyl acrylate (beta-CEA) monomers, although not limited to these monomers, termed herein as monomers A, B, and C, prepared, for example, by emulsion polymerization in the presence of an initiator, a chain transfer agent (CTA), and surfactant.

The resin substantially free of cross linking can comprise styrene:butylacrylate:beta-carboxy ethyl acrylate wherein, for example, the non cross linked resin monomers can be present in an amount of about 70 percent to about 90 percent styrene, about 10 percent to about 30 percent butylacrylate, and about 0.05 parts per hundred to about 10 parts per hundred beta-CEA, or about 3 parts per hundred beta-CEA, by weight based upon the total weight of the monomers, although not limited. For example, the carboxylic acid can be selected, for example, from the group comprised of, but not limited to, acrylic acid, methacrylic acid, itaconic acid, beta carboxy ethyl acrylate (beta CEA), fumaric acid, maleic acid, and cinnamic acid.

In a feature herein, the non cross linked resin can comprise about 73 percent to about 85 percent styrene, about 27 percent to about 15 percent butylacrylate, and about 1.0 part per hundred to about 5 parts per hundred beta-CEA, by weight based upon the total weight of the monomers although the compositions and processes are not limited to these particular types of monomers or ranges. In another feature, the non cross linked resin can comprise about 81.7 percent styrene, about 18.3 percent butylacrylate and about 3.0 parts per hundred beta-CEA by weight based upon the total weight of the monomers.

The initiator can be, for example, but is not limited to, sodium, potassium or ammonium persulfate and can be present in the range of, for example, about 0.5 to about 3.0 percent based upon the weight of the monomers, although not limited. The CTA can be present in an amount of from about 0.5 to about 5.0 percent by weight based upon the combined weight of the monomers A and B, although not limited. The surfactant can be an anionic surfactant present in the range of from about 0.7 to about 5.0 percent by weight based upon the weight of the aqueous phase, although not limited to this type or range.

The resin can be a polyester resin such as an amorphous polyester resin, a crystalline polyester resin, and/or a combination thereof. The polymer used to form the resin can be a polyester resin described in U.S. Pat. Nos. 6,593,049 and 6,756,176, the disclosures of each of which are hereby incorporated by reference in their entirety. Suitable resins also include a mixture of an amorphous polyester resin and a crystalline polyester resin as described in U.S. Pat. No. 6,830,860, the disclosure of which is hereby incorporated by reference in its entirety.

The resin can be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfa-aliphatic dials such as sodio 2-sulfa-1,2-ethanedial, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfa-1,3-propanediol, mixture thereof, and the like. The aliphatic diol may be, for example, selected in an amount of from about 40 to about 60 mole percent, such as from about 42 to about 55 mole percent, or from about 45 to about 53 mole percent (although amounts outside of these ranges can be used), and the alkali sulfo-aliphatic diol can be selected in an amount of from about 0 to about 10 mole percent, such as from about 1 to about 4 mole percent of the resin (although amounts outside of these ranges can be used).

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfa-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, from about 40 to about 60 mole percent, in embodiments from about 42 to about 52 mole percent, such as from about 45 to about 50 mole percent (although amounts outside of these ranges can be used), and the alkali sulfa-aliphatic diacid can be selected in an amount of from about 1 to about 10 mole percent of the resin (although amounts outside of these ranges can be used).

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), polypropylene-succinate), poly(butylene-succinate), poly(pentylene-succinate), poly(hexylene-succinate), poly(octylene-succinate), polyethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), polyethylene-decanoate), polyethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylerie-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copaly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly (octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly (5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly (ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), polypropylene-succinimide), and poly(butylene-succinimide).

The crystalline resin can be present, for example, in an amount of from about 5 to about 50 percent by weight of the toner components, such as from about 10 to about 35 percent by weight of the toner components (although amounts outside of these ranges can be used). The crystalline resin can possess various melting points of, for example, from about 30° C. to about 120° C., in embodiments from about 50° C. to about 90° C. (although melting points outside of these ranges can be obtained). The crystalline resin can have a number average molecular weight ($M_n$), as measured by gel permeation chromatography (GPC) of, for example, from about 1,000 to about 50,000, such as from about 2,000 to about 25,000 (although number average molecular weights outside of these ranges can be obtained), and a weight average molecular weight ($M_w$) of, for example, from about 2,000 to about 100,000, such as from about 3,000 to about 80,000 (although weight average molecular weights outside of these ranges can be obtained), as determined by Gel Permeation Chromatography using polystyrene standards. The molecular weight distribution ($M_w/M_n$) of the crystalline resin can be, for example, from about 2 to about 6, in embodiments from about 3 to about 4 (although molecular weight distributions outside of these ranges can be obtained).

Examples of diacids or diesters including vinyl diacids or vinyl diesters used for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester can be present, for example, in an amount from about 40 to about 60 mole percent of the resin, such as from about 42 to about 52 mole percent of the resin, or from about 45 to about 50 mole percent of the resin (although amounts outside of these ranges can be used).

Examples of diols that can be used in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diol selected can vary, and can be present, for example, in an amount from about 40 to about 60 mole percent of the resin, such as from about 42 to about 55 mole percent of the resin, or from about 45 to about 53 mole percent of the resin (although amounts outside of these ranges can be used).

Polycondensation catalysts which may be used in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be used in amounts of, for example, from about 0.01 mole percent to about 5 mole percent based on the starting diacid or diester used to generate the polyester resin (although amounts outside of this range can be used).

Suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be used include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfoisophthalate), copoly propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

An unsaturated amorphous polyester resin can be used as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. A suitable polyester resin can be a polyalkoxylated bisphenol A-co-terephthalic acid/dodecenylsuccinic acid/trimellitic acid resin, or a polyalkoxylated bisphenol A-co-terephthalic acid/fumaric acid/dodecenylsuccinic acid resin, or a combination thereof.

Such amorphous resins can have a weight average molecular weight (Mw) of from about 10,000 to about 100,000, such as from about 15,000 to about 80,000.

An example of a linear propoxylated bisphenol a fumarate resin that can be used as a latex resin is available under the trade name SPARII from Resana S/A Industrias Quimieas, Sao Paulo Brazil. Other propoxylated bisphenol a fumarate resins that can be used and are commercially available include GTUF and FPESL-2 from Kao Corporation, Japan, and EM181635 from Reichhold, Research Triangle Park, N.C., and the like.

Suitable crystalline resins that can be used, optionally in combination with an amorphous resin as described above, include those disclosed in U.S. Patent Application Publication No. 2006/0222991, the disclosure of which is hereby incorporated by reference in its entirety. In embodiments, a suitable crystalline resin can include a resin formed of dodecanedioic acid and 1,9-nonanediol.

Such crystalline resins can have a weight average molecular weight (Mw) of from about 10,000 to about 100,000, such as from about 14,000 to about 30,000.

For example, a polyalkoxylated bisphenol A-co-terephthalic acid/dodecenylsuccinic acid/trimellitic acid resin, or a polyalkoxylated bisphenol A-co-terephthalic acid/fumaric acid/dodecenylsuccinic acid resin, or a combination thereof, can be combined with a polydodecanedioic acid-co-1,9-nonanediol crystalline polyester resin.

The resins can have a glass transition temperature of from about 30° C. to about 80° C., such as from about 35° C. to about 70° C. The resins can have a melt viscosity of from about 10 to about 1,000,000 Pa*S at about 130° C., such as from about 20 to about 100,000 Pa*S. One, two, or more toner resins may be used. Where two or more toner resins are used, the toner resins can be in any suitable ratio (e.g., weight ratio) such as, for instance, about 10 percent (first resin)/90 percent (second resin) to about 90 percent (first resin)/10 percent (second resin). The resin can be formed by emulsion polymerization methods.

The resin can be formed at elevated temperatures of from about 30° C. to about 200° C., such as from about 50° C. to about 150° C., or from about 70° C. to about 100° C. However, the resin can also be formed at room temperature.

Stirring may be used to enhance formation of the resin. Any suitable stirring device may be used. In embodiments, the stirring speed can be from about 10 revolutions per minute (rpm) to about 5,000 rpm, such as from about 20 rpm to about 2,000 rpm, or from about 50 rpm to about 1,000 rpm. The stirring speed can be constant or the stirring speed can be varied. For example, as the temperature becomes more uniform throughout the mixture, the stirring speed can be increased. However, no mechanical or magnetic agitation is necessary in the method disclosed herein.

Solvent

Any suitable organic solvent can be contacted with the resin in the resin composition to help dissolve the resin in the resin composition. Suitable organic solvents for the methods disclosed herein include alcohols, such as methanol, ethanol, isopropanol, butanol, as well as higher homologs and polyols, such as ethylene glycol, glycerol, sorbitol, and the like; ketones, such as acetone, 2-butanone, 2-pentanone, 3-pentanone, ethyl isopropyl ketone, methyl isobutyl ketone, diisobutyl ketone, and the like; amides, such as dimethylformamide, dimethylacetamide, N-methylpyrrolidone, 1,2-dimethyl-2-imidazolidinone, and the like; nitriles, such as acetonitrile, propionitrile, butyronitrile, isobutyronitrile, valeronitrile, benzonitrile, and the like; ethers, such as ditertbutyl ether, dimethoxyethane, 2-methoxyethyl ether, 1,4- dioxane, tetrahydrohyran, morpholine, and the like; sulfones, such as methylsulfonylmethane, sulfolane, and the like; sulfoxides, such as dimethylsulfoxide; phosphoramides, such as hexamethylphosphoramide; benzene and benzene derivatives; as well as esters, amines and combinations thereof, in an amount of, for example from about 1 wt % to 99 wt %, from about 20 wt % to 80 wt %, or from about 20 wt % to about 50 wt %.

The organic solvent can be immiscible in water and can have a boiling point of from about 30° C. to about 100° C. Any suitable organic solvent can also be used as a phase or solvent inversion agent. The organic solvent can be used in an amount of from about 1% by weight to about 25% by weight of the resin, such as from about 5% by weight to about 20% by weight of the resin, or from about 10% by weight of the resin to about 15% by weight of the resin.

Neutralizing Agent

A neutralizing agent can be contacted with the resin in the resin composition to, for example, neutralize acid groups in the resins. The neutralizing agent can be contacted with the resin as a solid or in an aqueous solution. The neutralizing agent herein can also be referred to as a "basic neutralization agent" Any suitable basic neutralization reagent can be used in accordance with the present disclosure.

Suitable basic neutralization agents include both inorganic basic agents and organic basic agents. Suitable basic agents include, for example, ammonium hydroxide, potassium hydroxide, sodium hydroxide, sodium carbonate, sodium bicarbonate, lithium hydroxide, potassium carbonate, potassium bicarbonate, combinations thereof, and the like. Suitable basic agents also include monocyclic compounds and polycyclic compounds having at least one nitrogen atom, such as, for example, secondary amines, which include aziridines, azetidines, piperazines, piperidines, pyridines, pyridine derivatives, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, triethyl amines, triethaholamines, diphenyl amines, diphenyl amine derivatives, poly(ethylene amine), poly(ethylene amine derivatives, amine bases, pyrimidines, pyrroles, pyrrolidines, pyrrolidinones, indoles, indolines, indanones, benzindazoles, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. The monocyclic and polycyclic compounds can be unsubstituted or substituted at any carbon position on the ring.

The basic agent can be used as a solid such as, for example, sodium hydroxide flakes, so that it is present in an amount of from about 0.001% by weight to 50% by weight of the resin, such as from about 0.01% by weight to about 25% by weight of the resin, or from about 0.1% by weight to 5% by weight of the resin.

As noted above, the basic neutralization agent can be added to a resin possessing acid group. The addition of the basic neutralization agent may thus raise the pH of an emulsion including a resin possessing acid group to a pH of from about 5 to about 12, in embodiments, from about 6 to about 11. The neutralization of the acid groups can enhance formation of the emulsion.

The neutralization ratio can be from about 25% to about 500%, such as from about 50% to about 450%, or from about 100% to about 400%.

Surfactant

As discussed above, a surfactant can be contacted with the resin prior to formation of the resin composition used to form the latex emulsion. One, two, or more surfactants can be used. The surfactants can be selected from ionic surfactants and nonionic surfactants. The latex for forming the resin used in forming a toner can be prepared in an aqueous phase containing a surfactant or co-surfactant, optionally under an inert gas such as nitrogen. Surfactants used with the resin to form a latex dispersion can be ionic or nonionic surfactants in an amount of from about 0.01 to about 15 weight percent of the solids, such as from about 0.1 to about 10 weight percent of the solids.

Anionic surfactants that can be used include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like. Other suitable anionic surfactants include, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants can be used.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. A suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be used.

The choice of particular surfactants or combinations thereof, as well as the amounts of each to be used, are within the purview of those skilled in the art.

Processing

Conventional PIE methods add liquid-phase water into a resin composition and use mechanical agitation to drive the emulsification process. Instead of, or in addition to, liquid-phase water, the method disclosed herein uses steam, or gas-phase water, to drive the emulsification process.

The steam can be introduced to the resin composition when the resin composition is at room temperature. The steam can be introduced to the resin composition when the resin composition is heated, such as to a temperature of from room temperature to about 90° C., such as from about 40° C. to about 80° C., or from about 50° C. to about 70° C. Water vapor carries a significant amount of heat. A transfer of heat occurs when the water vapor contacts the resin. The steam can be introduced to the resin composition at a temperature of from about 80° C. to about 150° C., such as from about 90° C. to about 145° C., or about 95° C. to about 120° C. The pressure of the steam introduced to the resin composition can be from about 0.04 bar to about 35 bar, such as from about 0.1 bar to about 20 bar, or from about 0.7 bar to about 4.5 bar.

The solvent can evaporate spontaneously upon introducing the steam.

At its initial stage, the resin can be in a "water-in-oil phase." Injection, such as continuous injection, of water vapor into the resin composition can be used to heat the resin composition and can cause the heated oil to become less viscous. The resin composition becomes less dense locally while the gas-phase water content expands into the resin composition at micro zones. Due to the temperature gradient, colder portions of the resin composition quickly aggregate to the area directly exposed to the water vapor. Such aggregation drives the emulsification process. Due to a concentration gradient, particularly a micro scale concentration gradient, provided by gas-phase water injection, the emulsification process is further driven by enhanced diffusion.

In addition, steam flooding under vapor pressure carrying kinetic energy can be used to introduce further shearing and/or mixing between the resin composition and the water to promote emulsification. The shearing and mixing can occur at macro scale and on the molecular level due to the gas phase of steam. Using steam in the process satisfies the conditions for kinetic stabilization and the emulsion process.

The latex or emulsion produced by the method disclosed herein can comprise emulsified resin particles in an aqueous medium having a size of about 1500 nm or less, such as from about 10 nm to about 1200 nm, or from about 300 nm to about 1,000 nm, or from about 20 nm to about 300 nm. Particle size distribution of a latex produced according to the method disclosed herein can be from about 60 nm to about 300 nm, such as from about 100 nm to about 250 nm, or from about 125 nm to about 200 nm. The coarse content of the latex emulsion can be from about 0% by weight to about 1% by weight, such as from about 0.1% by weight to about 0.5% by weight, or from about 0.2% to about 0.4%. The solids content of the latex emulsion of the present disclosure can be from about 5% by weight to about 50% by weight, such as from about 10% by weight to about 45% by weight, or from about 30% by weight to about 40% by weight.

The size of the particles formed in the latex emulsion can be controlled by the concentration ratio of plasticizer, surfactant, and/or neutralizing agent to resin in the resin composition. The solids concentration of the latex emulsion can be controlled by the ratio of the resin composition to the water. The method disclosed herein can produce emulsified resin particles that retain the same molecular weight properties as the starting resin, such as the pre-made resins used in forming the latex or emulsion.

Following emulsification, additional surfactant, water, and/or neutralizing agent can be added to dilute the emulsion. Following emulsification, the emulsion can be cooled to room temperature, for example from about 20° C. to about 25° C. Following emulsification, the latex or emulsion can be distilled to remove residual solvent in the latex or emulsion.

Embodiments of the latex or emulsion of the present disclosure can be used to produce particles suitable for EA processes, such as particles having a size suitable for low melt EA processes, such as ultra low melt EA processes, using crystalline and/or amorphous polyester resins. Embodiments of the latex emulsions can be produced with a low coarse content without the use of homogenization or filtration.

The latex or emulsion can have mono or bimodal distribution of particle size. The distribution of particle size can be from about 5 to about 1000 nm, such as from about 20 to about 90 nm, or from about 40 nm to about 800 nm, or from about 50 nm to about 700 nm.

Preparation of Toner

As discussed above, the latex emulsion produced according to the method disclosed herein can be used to form a toner, such as an EA toner. The latex emulsion can be added to a pre-toner mixture, such as before particle aggregation in the EA coalescence process. The latex or emulsion, as well as a binder resin, a wax such as a wax dispersion, a colorant, and any other desired or required additives such as surfactants, may form the pre-toner mixture.

The pre-toner mixture can be prepared, and the pH of the resulting mixture can be adjusted, by an acid such as, for example, acetic acid, nitric acid or the like. The pH of the mixture can be adjusted to be from about 4 to about 5, although a pH outside this range can be used. Additionally, the mixture can be homogenized. If the mixture is homogenized, homogenization can be accomplished by mixing at a mixing speed of from about 600 to about 4,000 revolutions per minute, although speeds outside this range can be used. Homogenization can be accomplished by any suitable means, including, for example, an IKA ULTRA TURRAX T50 probe homogenizer.

Aggregation

Following the preparation of the above mixture, including the addition or incorporation into the pre-toner mixture of the latex emulsion produced by the methods disclosed herein, an aggregating agent can be added to the mixture. Any suitable aggregating agent can be used to form a toner. Suitable aggregating agents include, for example, aqueous solutions of a divalent cation or a multivalent cation material. The aggregating agent can be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. The aggregating agent can be added to the mixture at a temperature that is below the glass transition temperature (TG) of the resin.

The aggregating agent can be added to the mixture used to form a toner in an amount of, for example, from about 0.01 percent to about 8 percent by weight, such as from about 0.1 percent to about 1 percent by weight, or from about 0.15 percent to about 0.8 percent by weight, of the resin in the mixture, although amounts outside these ranges can be used. The above can provide a sufficient amount of agent for aggregation.

To control aggregation and subsequent coalescence of the particles, the aggregating agent can be metered into the mixture over time. For example, the agent can be metered into the mixture over a period of from about 5 to about 240 minutes, such as from about 30 to about 200 minutes, although more or less time can be used as desired or required. The addition of the agent can occur while the mixture is maintained under stirred conditions, such as from about 50 revolutions per minute to about 1,000 revolutions per minute, or from about 100 revolutions per minute to about 500 revolutions per minute, although speeds outside these ranges can be used. The addition of the agent can also occur while the mixture is maintained at a temperature that is below the glass transition temperature of the resin discussed above, such as from about 30° C. to about 90° C., or from about 35° C. to about 70° C., although temperatures outside these ranges can be used.

The particles can be permitted to aggregate until a predetermined desired particle size is obtained. A predetermined desired size refers to the desired particle size to be obtained as determined prior to formation, and the particle size being monitored during the growth process until such particle size is reached. Samples can be taken during the growth process and analyzed, for example with a Coulter Counter, for average particle size. The aggregation thus can proceed by maintaining the elevated temperature, or slowly raising the temperature to, for example, from about 30° C. to about 99° C., and holding the mixture at this temperature for a time from about 0.5 hours to about 10 hours, such as from about hour 1 to about 5 hours (although times outside these ranges may be utilized), while maintaining stirring, to provide the aggregated particles. Once the predetermined desired particle size is reached, then the growth process is halted. The predetermined desired particle size can be within the desired size of the final toner particles.

The growth and shaping of the particles following addition of the aggregation agent can be accomplished under any suitable conditions. For example, the growth and shaping can be conducted under conditions in which aggregation occurs separate from coalescence. For separate aggregation and coalescence stages, the aggregation process can be conducted under shearing conditions at an elevated temperature, for example, of from about 40° C. to about 90° C., such as from about 45° C. to about 80° C. (although temperatures outside these ranges may be utilized), which can be below the glass transition temperature of the resin as discussed above.

Once the desired final size of the toner particles is achieved, the pH of the mixture can be adjusted with a base to a value of from about 3 to about 10, such as from about 5 to about 9, although a pH outside these ranges may be used.

The adjustment of the pH can be used to freeze, that is to stop, toner growth. The base utilized to stop toner growth can include any suitable base such as, for example, alkali metal hydroxides such as, for example, sodium hydroxide, potassium hydroxide, ammonium hydroxide, combinations thereof, and the like. In embodiments, ethylene diamine tetraacetie acid (EDTA) may be added to help adjust the pH to the desired values noted above.

Core-Shell Structure

After aggregation, but prior to coalescence, a resin coating can be applied to the aggregated particles to form a shell thereover. Any resin described above as suitable for forming the toner resin can be used as the shell.

Resins that can be used to form a shell include, but are not limited to, crystalline polyesters described above, and/or the amorphous resins described above for use as the core. For example, a polyalkoxylated bisphenol A-co-terephthalic acid/dodecenylsuccinic acid/trimellitic acid resin, a polyalkoxylated bisphenol A-co-terephthalic acid/fumaric acid/dodecenylsuccinic acid resin, or a combination thereof, can be combined with a polydodecanedioic acid-co-1,9-nonanediol crystalline polyester resin to form a shell. Multiple resins can be used in any suitable amounts.

The shell resin can be applied to the aggregated particles by any method within the purview of those skilled in the art. The resins utilized to form the shell can be in an emulsion including any surfactant described above. The emulsion possessing the resins can be combined with the aggregated particles described above so that the shell forms over the aggregated particles. In embodiments, the shell may have a thickness of up to about 5 microns, such as from about 0.1 to about 2 microns, or from about 0.3 to about 0.8 microns, over the formed aggregates, although thicknesses outside of these ranges may be obtained.

The formation of the shell over the aggregated particles can occur while heating to a temperature of from about 30° C. to about 80° C. in embodiments from about 35° C. to about 70° C., although temperatures outside of these ranges can be utilized. The formation of the shell can take place for a period of time of from about 5 minutes to about 10 hours, such as from about 10 minutes to about 5 hours, although times outside these ranges may be used.

For example, the toner process can include forming a toner particle by mixing the polymer latexes, in the presence of a wax dispersion and a colorant with an optional coagulant while blending at high speeds. The resulting mixture having a pH of, for example, of from about 2 to about 3, can be aggregated by heating to a temperature below the polymer resin Tg to provide toner size aggregates. Optionally, additional latex can be added to the formed aggregates providing a shell over the formed aggregates. The pH of the mixture can be changed, for example, by the addition of a sodium hydroxide solution, until a pH of about 7 may be achieved.

Coalescence

Following aggregation to the desired particle size and application of any optional shell, the particles can be coalesced to the desired final shape. The coalescence can be achieved by, for example, heating the mixture to a temperature of from about 45° C. to about 100° C., such as from about 55° C. to about 99° C. (although temperatures outside of these ranges may be used), which can be at or above the glass transition temperature of the resins used to form the toner particles, and/or reducing the stirring, for example, to a stirring speed of from about 100 revolutions per minute to about 1,000 revolutions per minute, such as from about 200 revolutions per minute to about 800 revolutions per minute (although speeds outside of these ranges may be used). The fused particles can be measured for shape factor or circularity, such as with a Sysmex FPIA 2100 analyzer, until the desired shape is achieved.

Higher or lower temperatures can be used, it being understood that the temperature is a function of the resins used for the binder. Coalescence may be accomplished over a period of from about 0.01 hours to about 9 hours, such as from about 0.1 hours to about 4 hours (although times outside of these ranges can be used).

After aggregation and/or coalescence, the mixture can be cooled to room temperature, such as from about 20° C. to about 25° C. The cooling can be rapid or slow, as desired. Suitable cooling methods include introducing cold water to a jacket around the reactor. After cooling, the toner particles can be washed with water, and then dried. Drying can be accomplished by any suitable method for drying including, for example, freeze-drying.

Wax

A wax can be combined with the latex or emulsion, colorant, and the like in forming toner particles. When included, the wax can be present in an amount of, for example, from about 1 weight percent to about 25 weight percent of the toner particles, such as from about 5 weight percent to about 20 weight percent of the toner particles, although amounts outside these ranges can be used.

Suitable waxes include waxes having, for example, a weight average molecular weight of from about 500 to about 20,000, such as from about 1,000 to about 10,000, although molecular weights outside these ranges may be utilized. Suitable waxes include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that can be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes can be used. Waxes can be included as, for example, fuser roll release agents.

Colorant

The toner particles described herein can further include colorant. Colorant includes pigments, dyes, mixtures of dyes, mixtures of pigments, mixtures of dyes and pigments, and the like.

When present, the colorant can be added in an effective amount of, for example, from about 1 to about 25 percent by weight of the particle, such as from about 2 to about 12 weight percent. Suitable colorants include, for example, carbon black like REGAL 330® magnetites, such as Mobay magnetites MO8029™, M08060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there may be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components can also be selected as colorants. Other known colorants may be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Other Additives

The toner particles can contain other optional additives, as desired or required. For example, the toner can include positive or negative charge control agents, for example, in an amount of from about 0.1 to about 10 percent by weight of the toner, such as from about 1 to about 3 percent by weight of the toner (although amounts outside of these ranges may be used). Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety;

cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents can be applied simultaneously with the shell resin described above or after application of the shell resin.

External additive particles can be blended with the toner particles after formation including flow aid additives, which additives can be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica can be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate can be used as an external additive for providing lubricating properties, developer conductivity, tribo enhancement, enabling higher toner charge and charge stability by increasing the number of contacts between toner and carrier particles. A commercially available zinc stearate known as Zinc Stearate L, obtained from Ferro Corporation, can be used. The external surface additives can be used with or without a coating.

Each of these external additives can be present in an amount of from about 0.1 percent by weight to about 5 percent by weight of the toner, such as from about 0.25 percent by weight to about 3 percent by weight of the toner, although the amount of additives can be outside of these ranges. The toners may include, for example, from about 0.1 weight percent to about 5 weight percent titanium dioxide, such as from about 0.1 weight percent to about 8 weight percent silica, or from about 0.1 weight percent to about 4 weight percent zinc stearate (although amounts outside of these ranges may be used). Suitable additives include those disclosed in U.S. Pat. Nos. 3,590,000, 3,800,588, and 6,214,507, the disclosures of each of which are hereby incorporated by reference in their entirety. Again, these additives can be applied simultaneously with the shell resin described above or after application of the shell resin.

The toner particles can have a weight average molecular weight (Mw) in the range of from about 17,000 to about 80,000 daltons, a number average molecular weight ($M_n$) of from about 3,000 to about 10,000 daltons, and a MWD (a ratio of the $M_w$ to $M_n$ of the toner particles, a measure of the polydispersity, or width, of the polymer) of from about 2.1 to about 10 (although values outside of these ranges can be obtained).

Apparatus

FIG. 1 shows an embodiment of an apparatus for preparing the polymer latex and/or emulsion by direct steam injection as disclosed herein. In this embodiment, apparatus 1 comprises a steam generator 2, a reaction vessel 4, an injection nozzle (not pictured), and optionally a mechanical agitator 5 and a vacuum distillation system (not pictured). Reaction vessel 4 can have a jacket (not pictured). Steam is generated in the steam generator 2 and is transported via tubing 3 into the reaction vessel 4. A resin composition as disclosed herein is placed in reaction vessel 4 and the steam is injected by a vapor pressure through an injection nozzle. Although the mixing of the resin composition in reaction vessel 4 does not require mechanical agitation, a mechanical agitator 5 may be used to assist in agitating the resin composition.

Figure 2A:
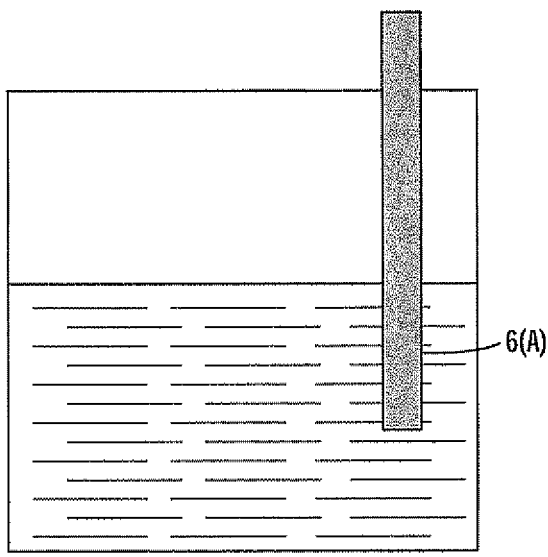
FIG. 2 shows embodiments of an apparatus for preparing latex or emulsion where an injection nozzle (a) is not immersed in the resin composition or (b) is immersed in the resin composition.
Figure 2B:
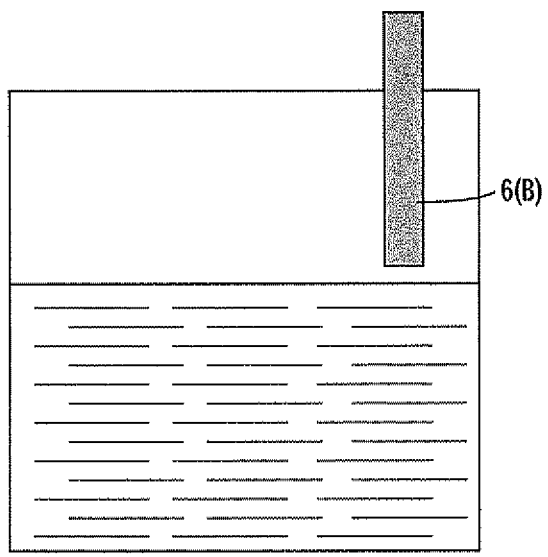

FIGS. 2(a) and 2(b) show embodiments of the apparatus where an injection nozzle 6(a) is placed in the resin composition, i.e. immersed in the resin composition (see FIG. 2(a)) or an injection nozzle 6(b) is placed above the resin composition, i.e. not immersed in the resin composition (see FIG. 2(b)).

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Material Preparation

Sample 1: 10 g amorphous resin 1 (Mw=44120, Tg onset=56.8° C.) was dissolved in 20 g MEK and 2 g IPA solvent mixture with stirring at room temperature.

Sample 2: 10 g amorphous resin 2 (Mw=86,000, Tg onset=56° C.) was dissolved in 10 g MEK and 1.50 g IPA solvent mixture with stirring at room temperature.

Comparative Example 1

Figure 3:
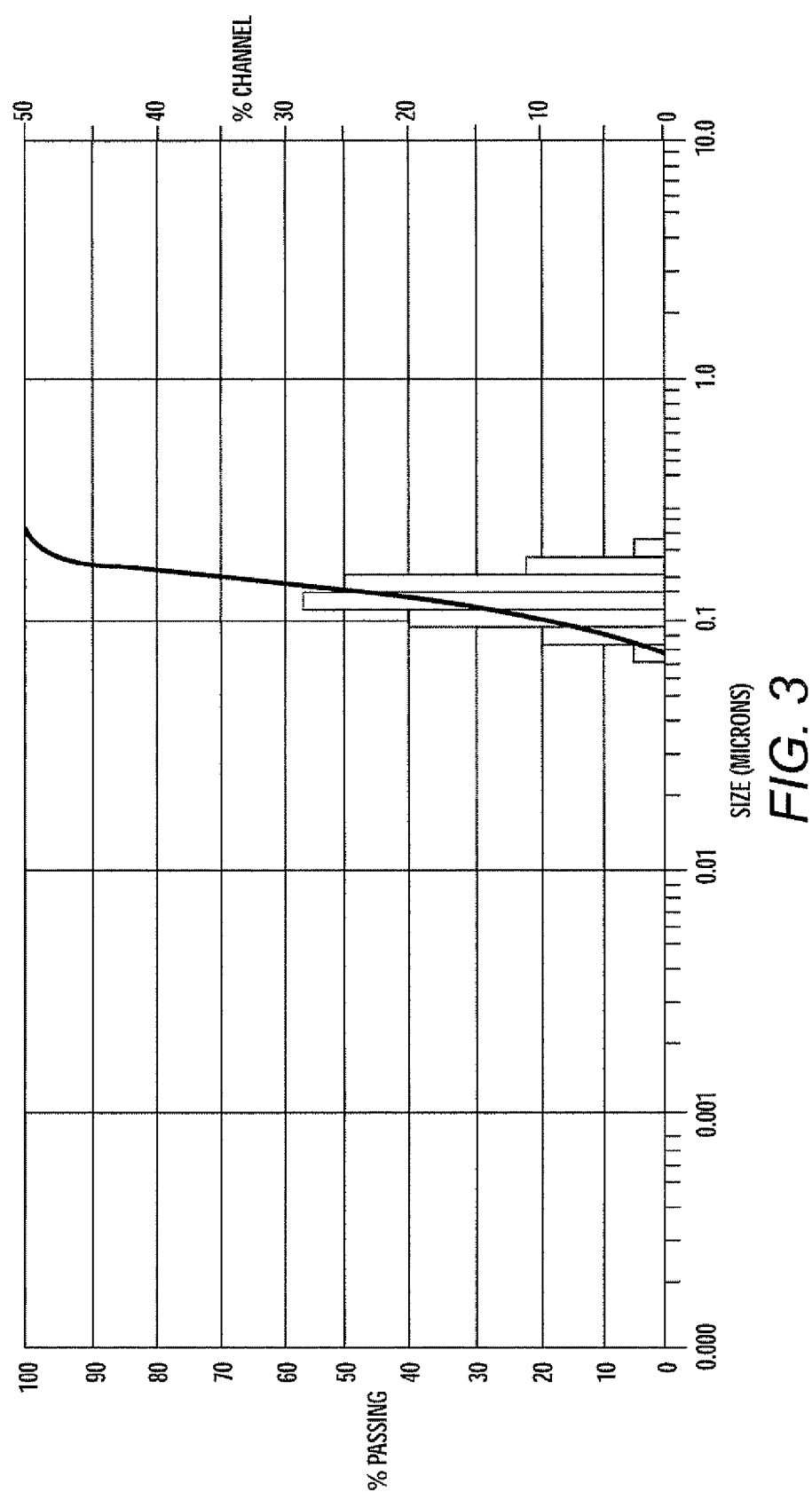
FIG. 3 shows the average particle size of Comparative Example 1.

3.48g of Sample 1 were transferred into a 10 ml glass vial, followed by the addition of 0.025 g of 10 wt % ammonium hydroxide. The contents of the glass vial were mixed completely and emulsified by adding de-ionized water (DIW) drop wise with agitation. The emulsion obtained had an average particle size of 135.2 nm, as illustrated in FIG. 3.

Comparative Example 2

Figure 4:
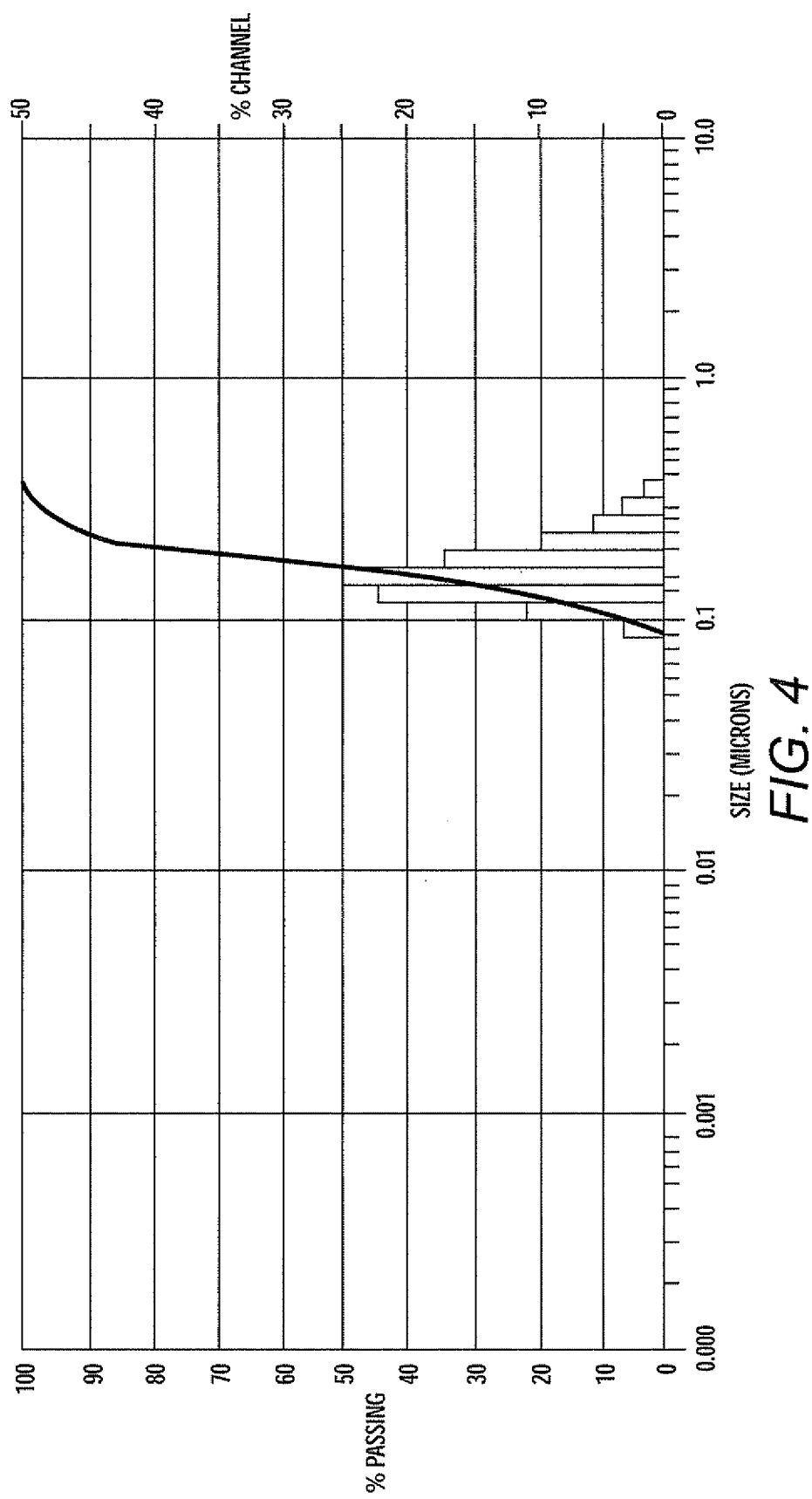
FIG. 4 shows the average particle size of Comparative Example 2.

2.69 g of Sample 2 was transferred to a 10 ml glass vial, followed by the addition of 0.041 g of 10 wt % ammonium hydroxide. The contents of the glass vial were mixed completely and emulsified by adding DIW drop wise with agitation. The emulsion obtained had an average particle size of 157.9 nm, as illustrated in FIG. 4.

Example 1

Figure 5:
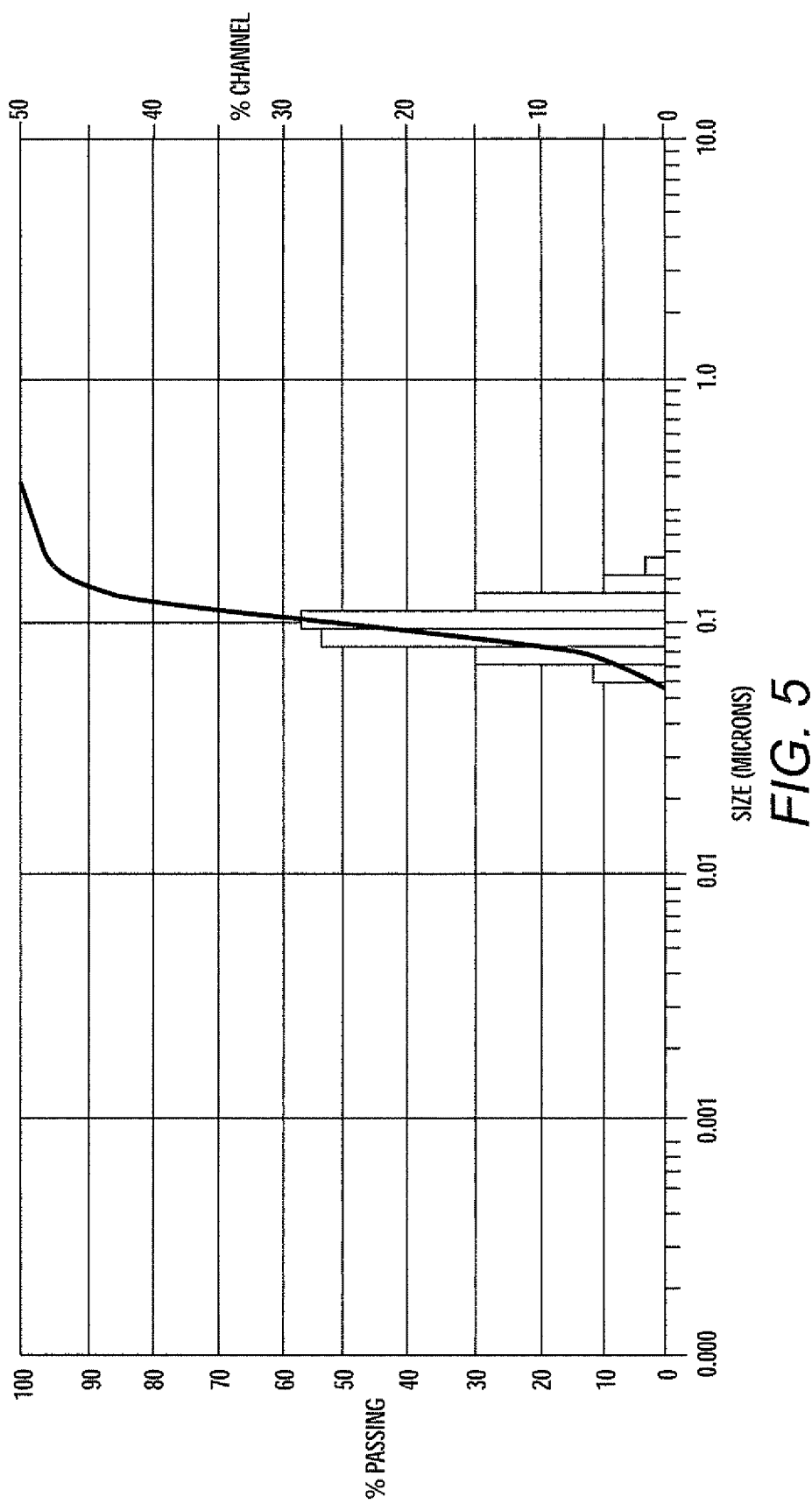
FIG. 5 shows the average particle size of Example 1.

6.48 g of Sample 1 was transferred into a 50 ml Erlenmeyer flask ("reaction vessel"), followed by the addition of 0.07 g of 10 wt % ammonium hydroxide. DIW was loaded in a steam generator chamber and boiled to generate the required steam. Steam was then injected through a copper tube into the reaction vessel at 1 bar. The emulsification immediately started locally around injection opening while quickly and spontaneously expanding throughout the reaction vessel. The whole process to full emulsification (by visualization) lasted about 5 minutes. The emulsion obtained has an average particle size of 103.6 nm (see FIG. 5). The Gel permeation chromatography (GPC) analysis in Table 1 shows that there was no significant molecular weight difference between Example 1 and Comparative Example 1. Thus, the method used for Example 1 did not degrade the original resin.

Example 2

Figure 6:
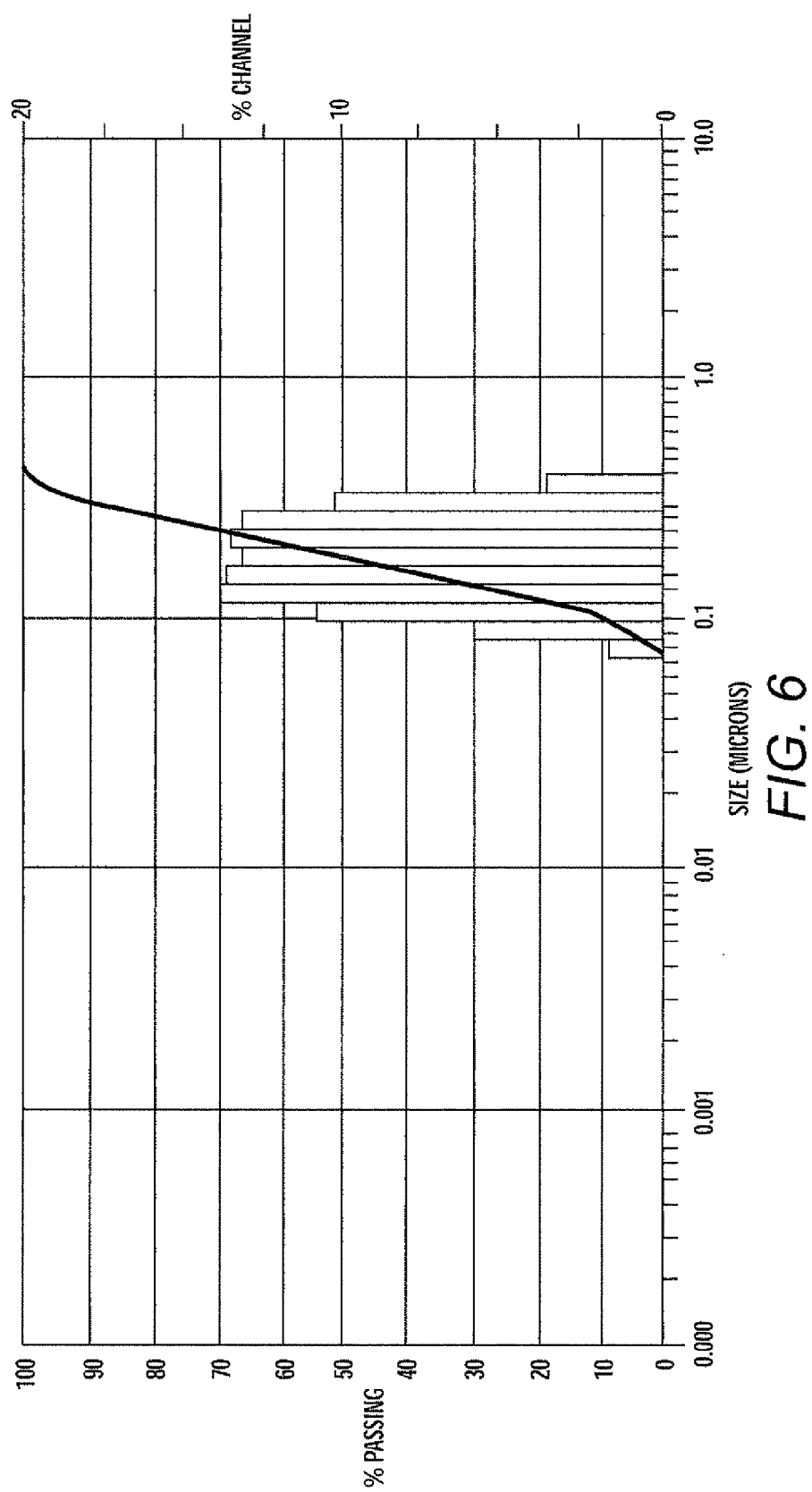
FIG. 6 shows the average particle size of Example 2.

5.38 g of the above Sample 1 was transferred into a 50 ml Erlenmeyer flask ("reaction vessel"), followed by the addition of 0.07 g of 10 wt % ammonium hydroxide. DIW was loaded in a steam generator chamber and boiled to generate required steam. Steam was then injected through a copper tube into the reaction vessel at 1 bar. The emulsification immediately started locally around injection opening, quickly and spontaneously expanding throughout the reaction vessel. The whole process to full emulsification (by visualization) lasted about 5 minutes. The emulsion obtained had minor bimodal average particle sizes at 259.8 nm and 137 nm (see FIG. 6). The Gel permeation chromatography (GPC) analysis in Table 1 shows that there was no significant molecular weight difference between Example 2 and Comparative Example 2. Thus, the method used for preparing Example 2 did not degrade the original resin.

TABLE 1

Results of particle size and GPC analysis.

| Example ID | Particle Size (nm) | Mw | Mn | POI | Process |
|---|---|---|---|---|---|
| Example 1 | 103.6 | 43.43 | 5.84 | 7.44 | Steam DIW |
| Example 2 | 259.8/137 | 91.03 | 5.04 | 18.07 | Steam DIW |
| Comparative Example 1 | 135.2 | 47.65 | 5.81 | 8.21 | Liquid DIW |
| Comparative Example 2 | 157.9 | 107.37 | 5.01 | 21.44 | Liquid DIW |

It will be appreciated that various of the above-disclosed and other features and functions, or alternatives thereof, can be combined into many other different systems or applications. Also, various presently unforeseen or unanticipated alternatives, modifications, variations or improvements therein can be subsequently made by those skilled in the art, and are also intended to be encompassed by the following claims.

What is claimed is:

1. A method for preparing a latex or emulsion, the method comprising:
   a) contacting a polyester resin with an organic solvent and an optional neutralizing agent to form a resin composition; and
   b) introducing steam to the resin composition to drive emulsification of the resin composition in the absence of mechanical agitation, thereby forming the latex or emulsion.

2. The method according to claim 1, wherein a neutralization ratio is from 25% to 500%.

3. The method according to claim 1, wherein the organic solvent is selected from the group consisting of a ketone, an alcohol, an ester, an ether, a nitrile, a sulfone, a sulfoxide, a phosphoramide, a benzene, a benzene derivative, an amine, and a combination of any of the above.

4. The method according to claim 1, wherein the steam is introduced to the resin composition at a temperature from about 80° C. to about 150° C.

5. The method according to claim 1, wherein the pressure of the steam introduced to the resin composition is from about 0.04 bar to about 35 bar.

6. The method according to claim 1, wherein the polyester resin comprises polyester, polyolefin, polycarbonate, polyamide, polyimide, or mixtures thereof.

7. The method according to claim 1, wherein the latex or emulsion has mono distribution of particle size from about 5 nm to about 1000 nm.

8. The method according to claim 1, wherein the latex or emulsion has bimodal distribution of particle size from about 5 nm to about 1000 nm.

9. The method according to claim 1, wherein the neutralizing agent is selected from the group consisting of ammonium hydroxide, sodium carbonate, potassium hydroxide, sodium hydroxide, sodium bicarbonate, lithium hydroxide, potassium carbonate, triethyl amine, triethanolamine, pyridine, pyridine derivatives, diphenylamine, diphenylamine derivatives, poly(ethylene amine), poly(ethylene amine) derivatives, amine bases, and pieprazine, and mixtures thereof.

10. The method according to claim 1, wherein the solvent evaporates spontaneously upon introducing the steam.

11. The method according to claim 1, wherein the steam is introduced to the resin composition at a pressure from about 0.7 bar to about 4.5 bar.

12. The method according to claim 1, wherein the steam is introduced to the resin composition at a pressure from about 0.1 bar to about 20 bar.

13. The method according to claim 1, wherein the steam is introduced to the resin composition at a temperature from about 95° C. to about 120° C.

14. The method according to claim 3, wherein the organic solvent comprises a methyl ethyl ketone.

15. The method according to claim 3, wherein the contacting in a) comprises contacting the resin with a neutralizing agent.

16. The method according to claim 1, wherein the steam is introduced into the resin by an injection nozzle immersed in the resin.

17. The method according to claim 1, wherein the latex or emulsion has a mono distribution of particle size from about 60 nm to about 300 nm.

18. The method according to claim 1, wherein the latex or emulsion has a bimodal distribution of particle size from about 60 nm to about 300 nm.

* * * * *